(12) United States Patent
Chen et al.

(10) Patent No.: US 9,462,329 B2
(45) Date of Patent: Oct. 4, 2016

(54) METHOD AND APPARATUS FOR FRAME RATE CONTROL IN TRANSMITTER OF WIRELESS COMMUNICATIONS SYSTEM

(71) Applicant: MEDIATEK INC., Hsin-Chu (TW)

(72) Inventors: Shao-Wei Chen, New Taipei (TW); Chao-Chun Wang, Taipei (TW); Tsai-Yuan Hsu, Hsinchu County (TW); Shun-Yong Huang, Taipei (TW); Chih-Shi Yee, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 346 days.

(21) Appl. No.: 14/135,599

(22) Filed: Dec. 20, 2013

(65) Prior Publication Data

US 2015/0181239 A1 Jun. 25, 2015

(51) Int. Cl.
*H04N 21/242* (2011.01)
*H04N 21/41* (2011.01)
*H04N 21/436* (2011.01)
*H04N 21/2343* (2011.01)

(52) U.S. Cl.
CPC ........... *H04N 21/43615* (2013.01); *H04N 21/234381* (2013.01); *H04N 21/242* (2013.01); *H04N 21/4122* (2013.01); *H04N 21/4126* (2013.01)

(58) Field of Classification Search
None
See application file for complete search history.

(56) References Cited

U.S. PATENT DOCUMENTS

| 8,265,168 B1* | 9/2012 | Masterson | H04N 7/12 375/240.25 |
|---|---|---|---|
| 2010/0146085 A1* | 6/2010 | Van Wie | A63F 13/12 709/220 |
| 2012/0057082 A1* | 3/2012 | Dunn | G06F 3/04897 348/739 |
| 2013/0279877 A1* | 10/2013 | Boak | H04N 5/917 386/231 |
| 2013/0322251 A1* | 12/2013 | Kotecha | H04W 28/24 370/236 |
| 2014/0379903 A1* | 12/2014 | Bouazizi | H04L 65/602 709/224 |

* cited by examiner

*Primary Examiner* — Reza Aghevli
(74) *Attorney, Agent, or Firm* — Winston Hsu; Scott Margo

(57) ABSTRACT

A method for frame rate control in a transmitter of a wireless communications system comprises generating a frame and a first information corresponding to a first expiration time of the frame by a frame generating module; handling the frame according to the first expiration time by a driver module; and informing the frame generating module an adjusting information according to a first pre-determined rule by the driver module.

16 Claims, 9 Drawing Sheets

METHOD AND APPARATUS FOR FRAME RATE CONTROL IN TRANSMITTER OF WIRELESS COMMUNICATIONS SYSTEM

BACKGROUND

The present invention relates to a method and apparatus utilized in a wireless communications system, and more particularly, to a method and apparatus of frame rate control in a transmitter in a wireless communication system.

Wireless Fidelity (Wi-Fi) Display specification is a standard for a Wi-Fi technology and used in a latency-aware application for streaming in a short distance, such as a wireless local area network (WLAN). In the Wi-Fi Display application, a connection is established between a source device and a sink device. The source device encodes video contents into encoded video bit streams and sends the encoded video bit streams to the sink device. The sink device further decodes the received video bit streams and recovers to the video contents. Therefore, a user can watch the video contents on a suitable display of the sink device for the user's purpose than a display of the source device. For example, a user shares a video from a notebook computer to a large screen television so that multiple people can comfortably watch the video on the television together. In this example, the notebook computer is the source device and the television is the sink device (assuming the television supports Wi-Fi Display specifications), and the source device transmits video contents to the sink device for playback on a display of the sink device.

Since the transmissions of the video bit streams between the source device and the sink device are wireless, throughput may vary with wireless channel conditions. When some of the video bit streams have collisions or loss, retransmissions are required to recover corruptions so that the throughput is decreased. For example, the throughput is decreased in a noisy or path-loss environment or decreased in a coexistence mode of Bluetooth and Wi-Fi technology.

Please refer to FIG. 1, which is a schematic diagram of a wireless communications system 10 according to the prior art. The wireless communications system 10 can be a Wi-Fi system. The wireless communications system 10 includes a source device 100 and a sink device 102. The source device 100 includes a frame generating module 104 and a source driver module 106. The sink device 102 includes a sink driver module 108 and a display 110. The frame generating module 104 is used for generating slices partitioned from a frame and sending the slices to the source driver module 106. The source driver module 106 further transmits the slices wirelessly to the sink driver module 108. The sink driver module 108 decodes the received slices and recovers the received slices to the frame. The display 110 finally displays the frame. However, if the slices from the source driver module 106 to the sink driver module 108 have collisions or loss due to noisy channels, retransmissions for the slices are required.

Please refer to FIG. 2, which is a schematic diagram of transmitting and receiving operations of the wireless communications system 10 according to the prior art. A frame FRM_A is generated by the frame generating module 104 and partitioned into slices SLE_A1-SLE_A4. The slices SLE_A1-SLE_A4 are sequentially transmitted from the source driver module 106 to the sink driver module 108. But the slice SLE_A3 is not received by the sink driver module 108, so the source driver module 106 performs a retransmission for the slice SLE_A3 with a lower rate. The slice SLE_A4 is therefore queued in the source driver module 106 accordingly. However, the frame generating module 104 does not know that the source driver module 106 does not finish the transmissions for the slices SLE_A3 and SLE_A4 and further generates a frame FRM_B and partitions the frame FRM_B into slices SLE_B1-SLE_B4 when a frame generating time TM_FG is reached. The slices SLE_B1-SLE_B4 are sent to the source driver module 106 and queued in the source driver module 106. Besides, the sink driver module 108 performs frame combination for a frame FRM_A' when a frame combining time TM_FC is reached and the display 110 displays the frame FRM_A', where the slices SLE_A3 and SLE_A4 are not successfully received by the sink driver module 108. Therefore, the display quality of the display 110 is degraded and the following retransmissions of the slice SLE_A3 and transmission of the slice SLE_A4 are useless for the combination of the frame FRM_A'.

As can be seen from the above, the retransmission of the slice SLE_A3 and the transmission of the slice SLE_A4 not only enlarge the latency between the transmissions of the frames FRM_A and FRM_B (i.e. between the transmissions of the slices SLE_A4 and SLE_B1) but are also useless for the combined frame FRM_A' in the sink driver module 108, so that the following frame transmissions are affected accordingly. Therefore, it is necessary for the frame generating module 104 to know the transmission status of the previous frame and further adjust the frame generating rate to overcome the useless situation and avoid the extra latency.

SUMMARY

The present invention therefore provides a method and apparatus for frame rate control in a wireless communications system, to reduce the latency, and further increase the quality of transmissions and displays.

A method for frame rate control in a transmitter of a wireless communications system is disclosed. The method comprises generating a frame and a first information corresponding to a first expiration time of the frame by a frame generating module; handling the frame according to the first expiration time by the driver module; and informing the frame generating module an adjusting information according to a first pre-determined rule by the driver module.

A communication apparatus for a wireless communications system is disclosed. The communication apparatus comprises a processor; a storage unit; and a program code, stored in the storage unit, wherein the program code instructs the processor to execute the following steps: generating a frame and a first information corresponding to a first expiration time of the frame by a frame generating module; handling the frame according to the first expiration time by the driver module; and informing the frame generating module an adjusting information according to a first pre-determined rule by the frame generating module These and other objectives of the present invention will no doubt become obvious to those of ordinary skill in the art after reading the following detailed description of the preferred embodiment that is illustrated in the various figures and drawings.

DETAILED DESCRIPTION

Figure 1:
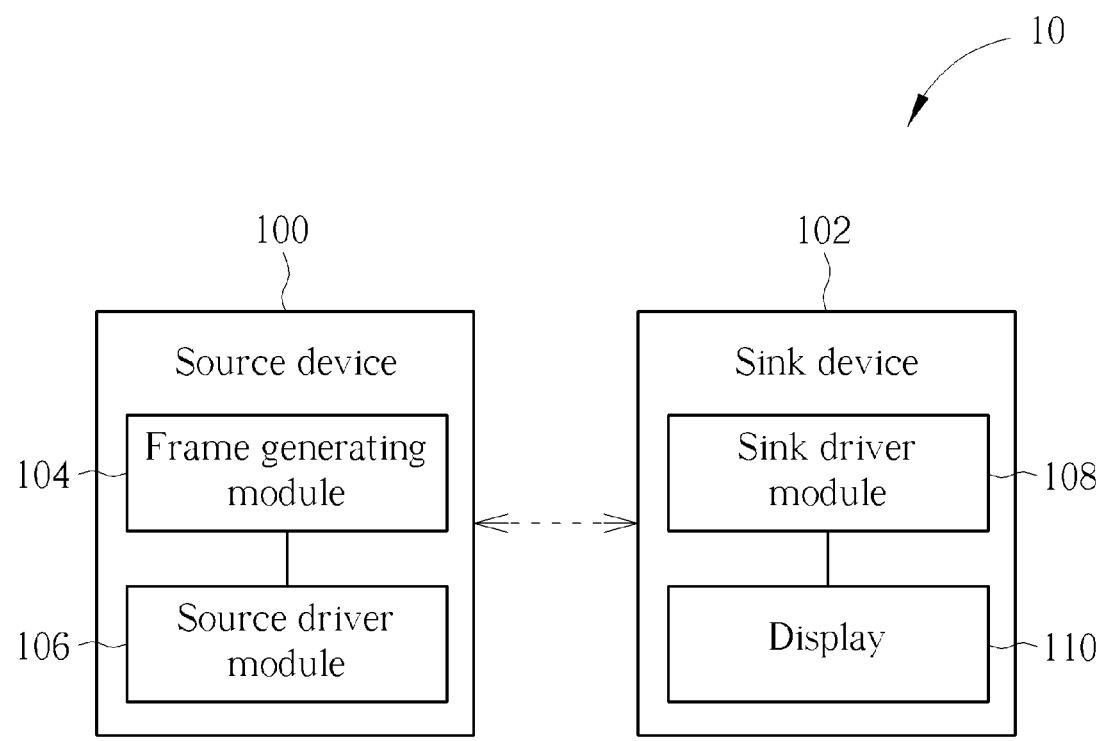
FIG. 1 is a schematic diagram of a wireless communications system according to the prior art.
Figure 2:
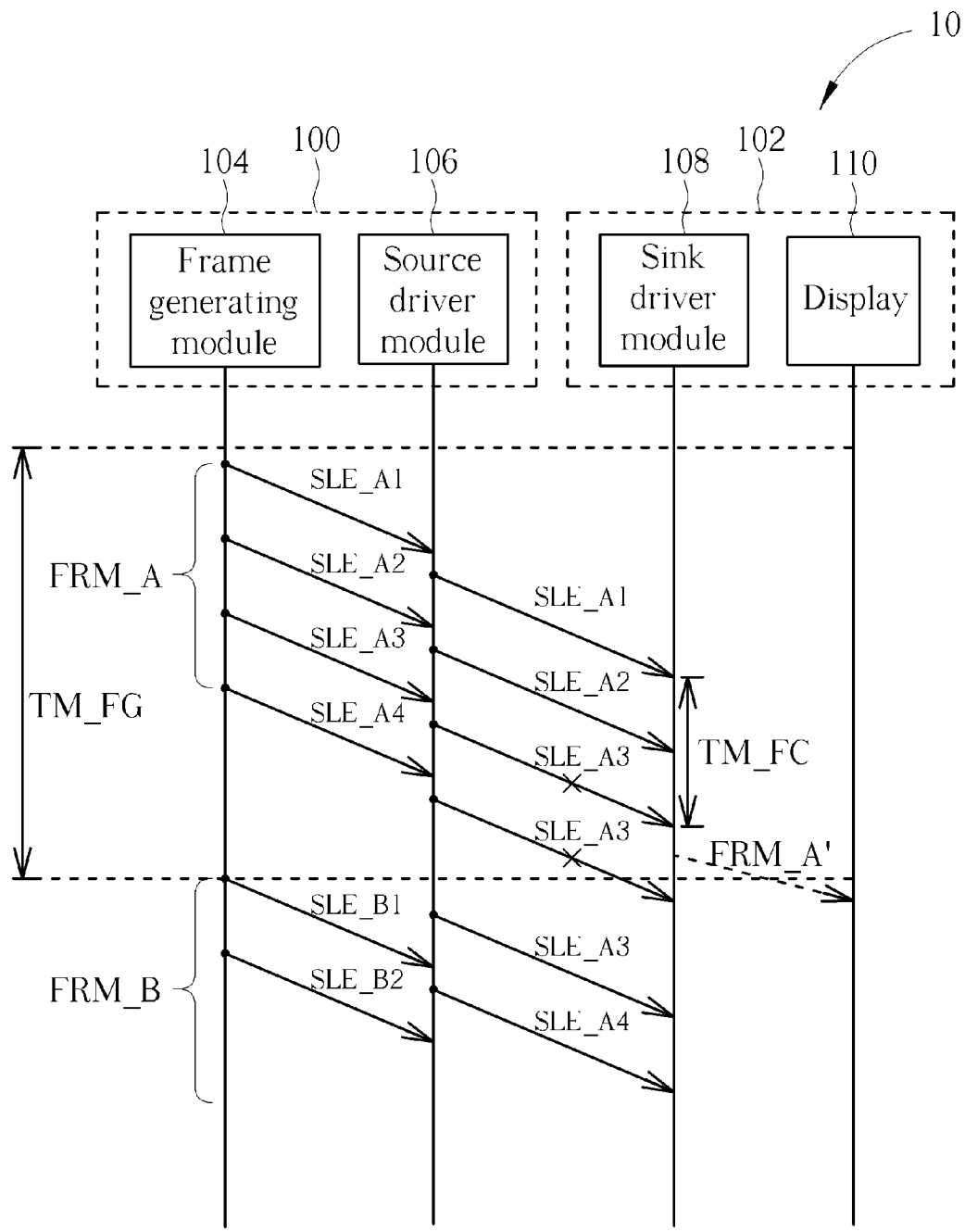
FIG. 2 is a schematic diagram of transmitting and receiving operations of the wireless communications system in FIG. 1 according to the prior art.
Figure 3:
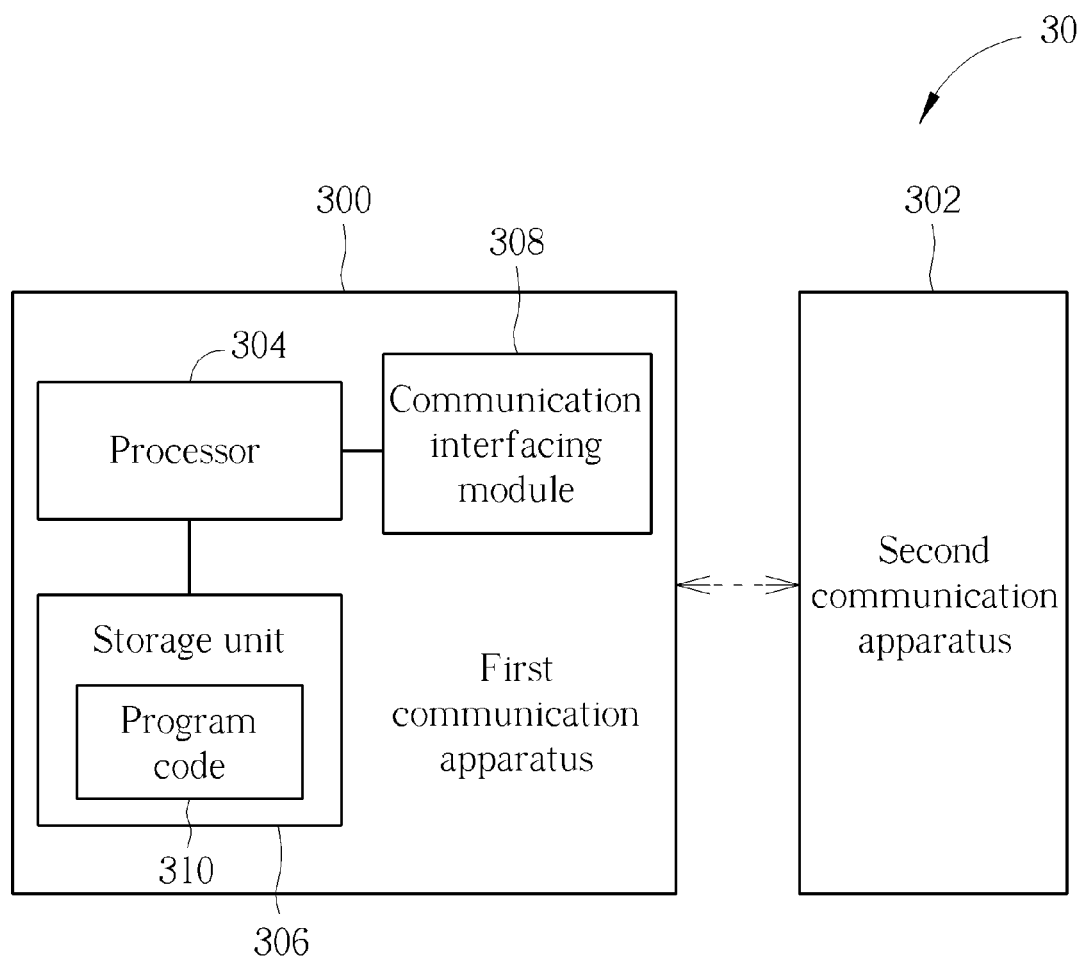
FIG. 3 is a schematic diagram of a wireless communications system according to an example the present invention.

Please refer to FIG. 3, which is a schematic diagram of a wireless communications system 30 according to an example of the present invention. The wireless communications system 30 comprises a first communication apparatus 300 and a second communication apparatus 302. The first communication apparatus 300 and the second communication apparatus 302 are simply utilized for illustrating the structure of the wireless communications system 30. Practically, the first communication apparatus 300 and the second communication apparatus 302 can communicate with each other by a wireless technique, such as wireless fidelity (Wi-Fi), Bluetooth, or other applicable wireless techniques. For example, in a Wi-Fi system, the first communication apparatus 300 may be a source device and the second communication apparatus 302 may be a sink device. Besides, the first communication apparatus 300 may include a processor 304 such as a microprocessor or Application Specific Integrated Circuit (ASIC), a storage unit 306 and a communication interfacing module 308. The storage unit 306 may be any data storage device that can store a program code 310, accessed and executed by the processor 304. Examples of the storage unit 306 include but are not limited to read-only memory (ROM), flash memory, random-access memory (RAM), CD-ROM/DVD-ROM, magnetic tape, hard disk and optical data storage device. The communication interfacing module 308 is preferably a transceiver and is used to transmit and receive signals (e.g., messages or packets) according to processing results of the processor 304.

Figure 4A:
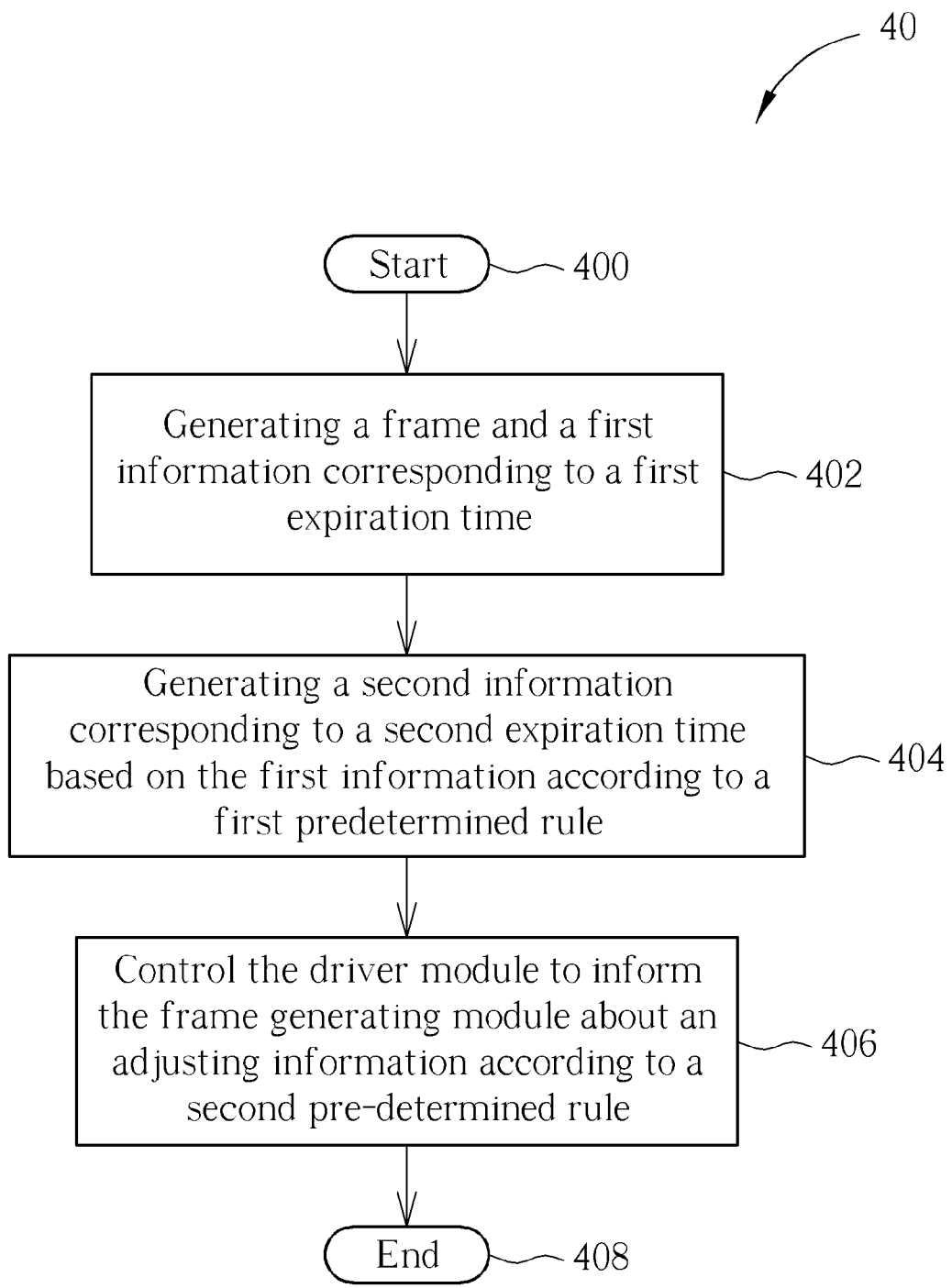
FIGS. 4A-4B are flowcharts of a process according to an example of the present invention.

Please refer to FIG. 4A, which is a flowchart of a process 40 according to an example of the present invention. The process 40 can be utilized in the wireless communications system 30 shown in FIG. 3, for frame rate control in a transmitting device. The process 40 can be implemented in the first communication apparatus 300 and may be compiled into the program code 310. The process 40 includes the following steps:

Step 400: Start.

Step 402: Generating a frame and a first information corresponding to a first expiration time.

Step 404: Handling the frame according to the first expiration time.

Step 406: Control the driver module to inform the frame generating module about an adjusting information according to a second pre-determined rule.

Step 408: End.

According to the process 40, the driver module controls the transmission of the frame according to the first information generated by the frame generating module, and further informs the frame generating module about the adjusting information. Therefore, the frame generating module can adjust the frame rate to reduce the latency, and further increase the quality of transmissions and displays.

In the process 40, the first pre-determined rule may be determined by a frame type and a system delay.

Figure 4B:
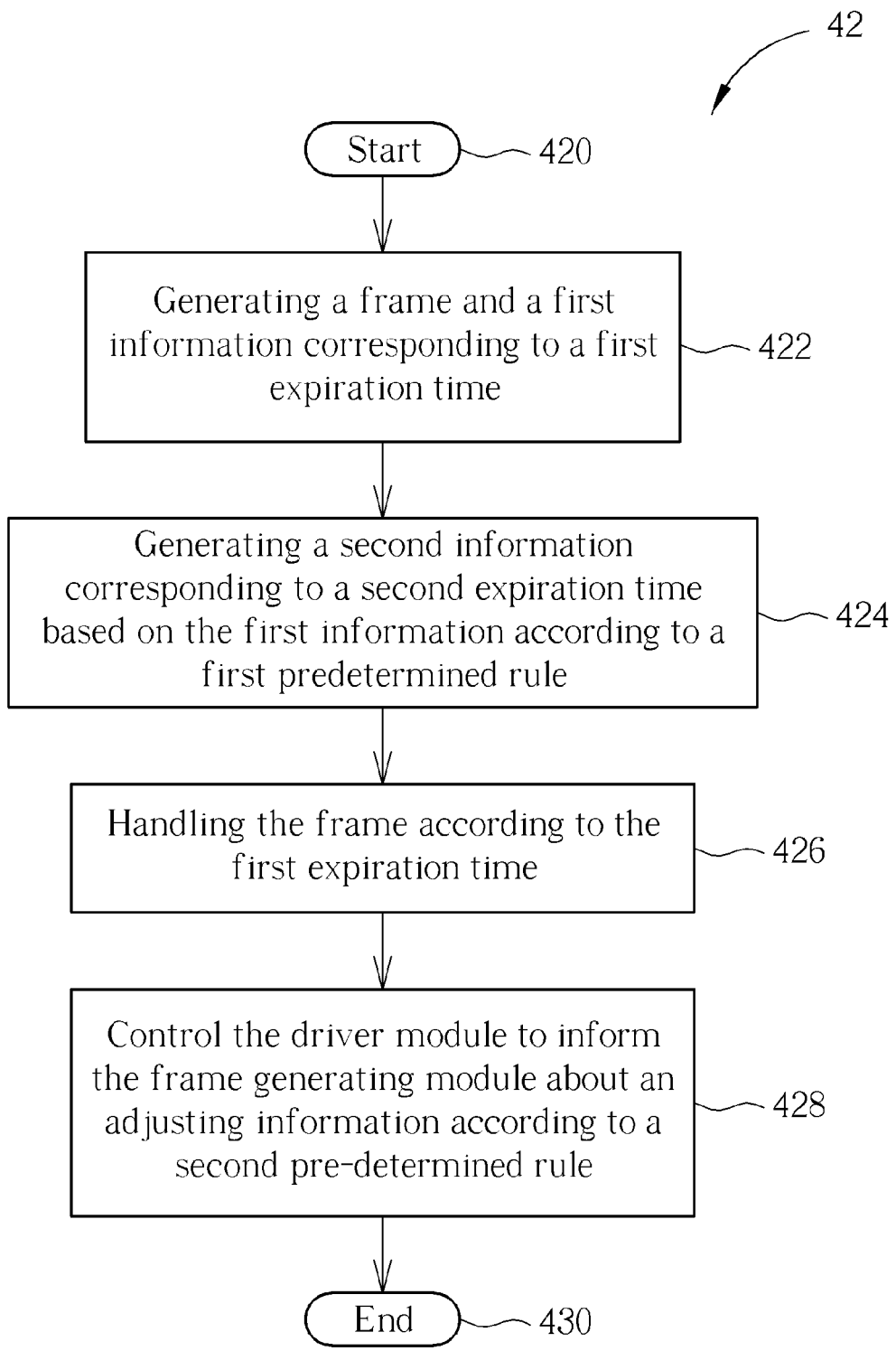

Please refer to FIG. 4B, which is a flowchart of a process 42 according to an example of the present invention. The process 42 can be utilized in the wireless communications system 30 shown in FIG. 3, for frame rate control in a transmitting device. The process 42 can be implemented in the first communication apparatus 300 and may be compiled into the program code 310. The process 42 includes the following steps:

Step 420: Start.

Step 422: Generating a frame and a first information corresponding to a first expiration time.

Step 424: Generating a second information corresponding to a second expiration time based on the first information according to a first predetermined rule.

Step 426: Handling the frame according to the first expiration time.

Step 428: Control the driver module to inform the frame generating module about an adjusting information according to a second pre-determined rule.

Step 430: End.

In the process 42, the first pre-determined rule may be determined by a frame type and a system delay. The first pre-determined rule can be determined as the following equation:

$$EP2 = f(EP1, SD) = EP1 - SD$$

wherein EP1 is the first information corresponding to the first expiration time, SD is the system delay of the first communication apparatus 300, and EP2 is the second information corresponding to the second expiration time. Besides, in the step 426, the driver module may transmit the frame if the second expiration time is not reached and drop the frame if the second expiration time is reached. Moreover, in the step 428, the second pre-determined rule may be determined by a transmission count, a drop count and a retry count, so that the driver module has to update the transmission count, the drop count and the retry count depending on the transmission status of the frame and generate the adjusting information accordingly.

Note that, the process 40 and the process 42 are examples of the present invention, and those skilled in the art should readily make combinations, modifications and/or alterations on the abovementioned description and examples. For example, the first information corresponding to the first expiration time may be assigned a different value according to the different frame type, such as I frame or P frame, and the system delay. Moreover, the first information corresponding to the first expiration time may be sent with the transmission of the frame from the frame generating module to the driver module or sent by other methods. Besides, the second information corresponding to the second expiration time may be implemented as a timer in the driver module and the driver module further starts the timer when receiving the frame. Furthermore, the adjusting information may be sent from the driver module to the frame generating module when the frame is handled or when the second expiration time is reached.

Figure 5A:
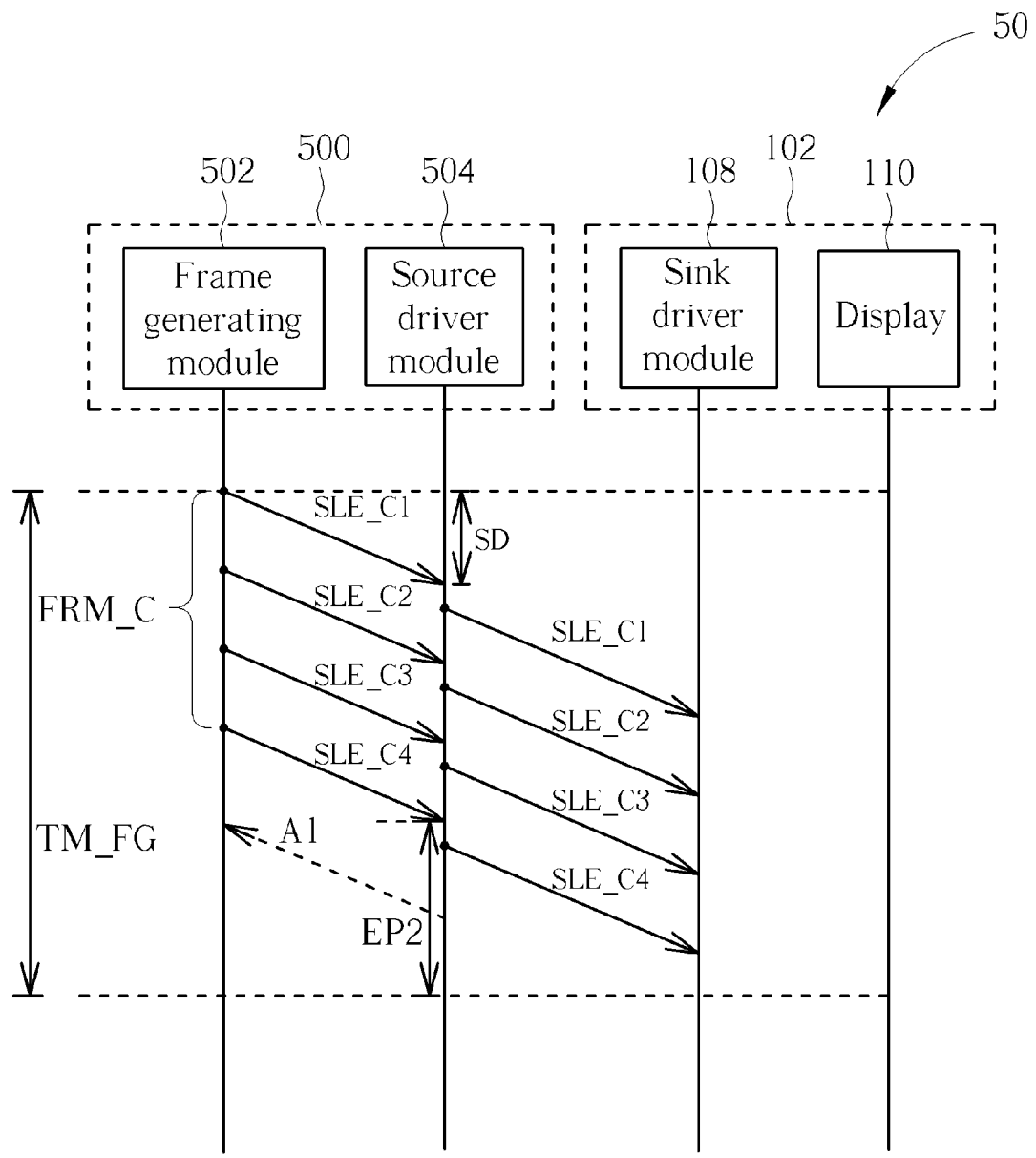
FIGS. 5A-5B are schematic diagrams of operations of a wireless communications system according to an example of the present invention.
Figure 5B:
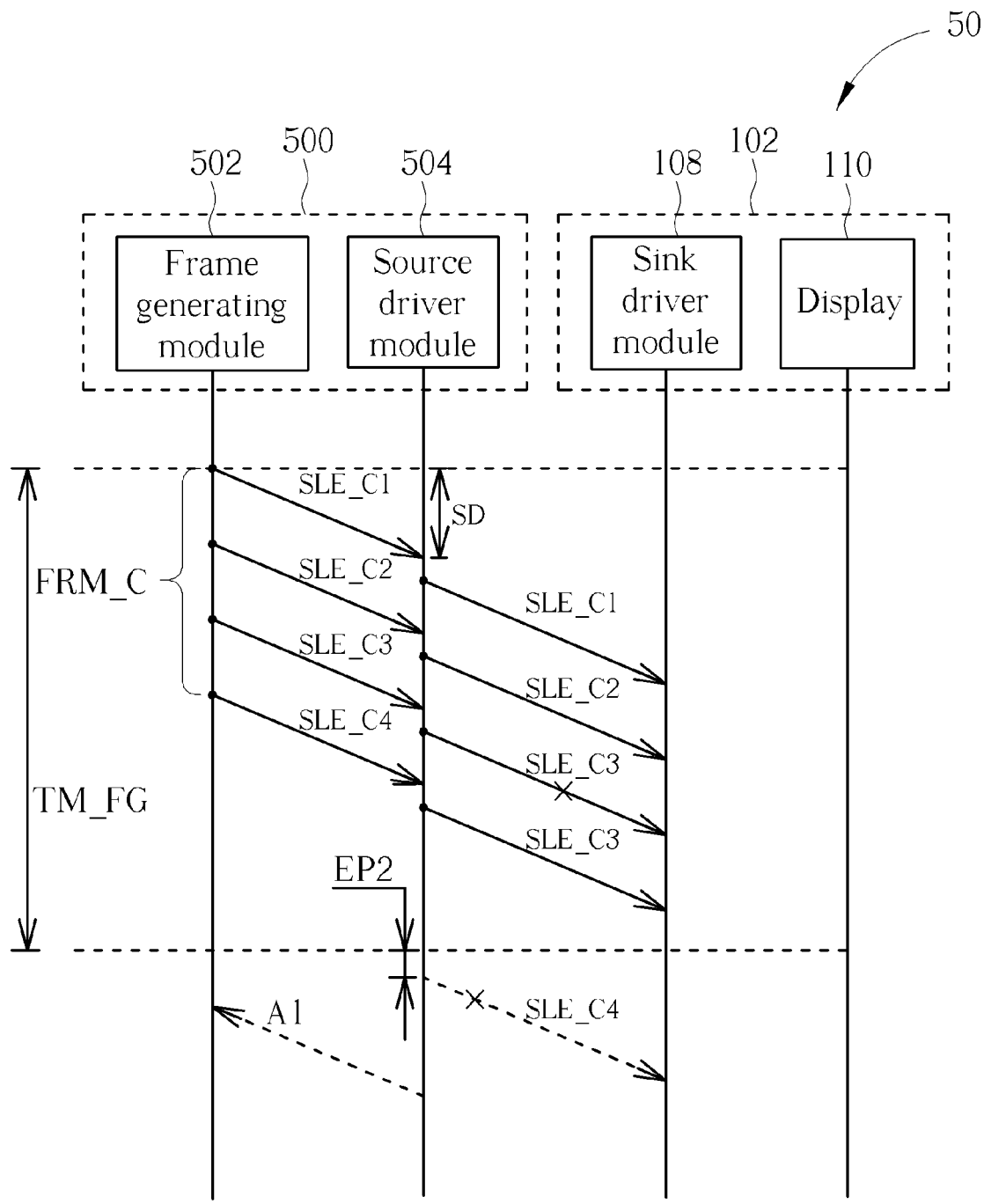

In addition, please refer to FIGS. 5A-5B, which are schematic diagrams of operations of a wireless communications system 50 according to an example of the present invention. The structure of the wireless communications system 50 is similar to that of the conventional wireless communications system 10, so the same elements continuously use the same names and symbols. However, the transmitting operation of the wireless communications system 50 is different than that of the conventional wireless communications system 10, so the source device 100 is modified and replaced by a source device 500. The frame generating module 104 and the source driver module 106 are respectively replaced by a frame generating module 502 and a source driver module 504 accordingly. The difference between the source device 100 and the source device 500 is that the source driver module 504 of the source device 500 executes the transmitting operation according to a specific algorithm and feeds back an adjusting information AI to the frame generating module 502, and the frame generating module 502 further adjusts the frame generating rate based on the adjusting information AI.

In detail, the frame generating module 502 generates frame FRM_C and partitions the frame FRM_C into slices SLE_C1-SLE_C4, and further transmits the slices SLE_C1-SLE_C4 to the source driver module 504. The source driver module 504 checks if the slice SLE_Cx (x=1, 2, 3, 4) can be sent to the sink device 102 according to the second information corresponding to the second expiration time EP2 which is calculated based on the first information corresponding to the first expiration time EP1 via a pre-determined rule. If the second expiration time is not reached, the source driver module 304 transmits the slice SLE_Cx to the sink device 102, as shown in FIG. 5A. Otherwise, the source driver module 504 drops the slice CLE_Cx, as shown in FIG. 5B. Further, the source driver module 504 updates the adjusting information AI and feeds back the adjusting information AI to the frame generating module 502 to adjust the frame generating rate. The second information corresponding to the second expiration time EP2 can be determined according to the following equations:

$$EP2 = f(EP1, SD) = EP1 - SD$$

wherein EP1 is the first information corresponding to first expiration time, and SD is the system delay of the source device module 500. Moreover, the first information corresponding to the first expiration time EP1 may be a specific time or a changeable frame generating time TM_FG. The frame generating time TM_FG may be assigned a different value for different frame type, such as I frame or P frame, or non-real time data. Besides, the adjusting information AI may contain a transmission count, a drop count and a re-try count which are updated depending on whether the frame FRM_C is transmitted or dropped.

Figure 6A:
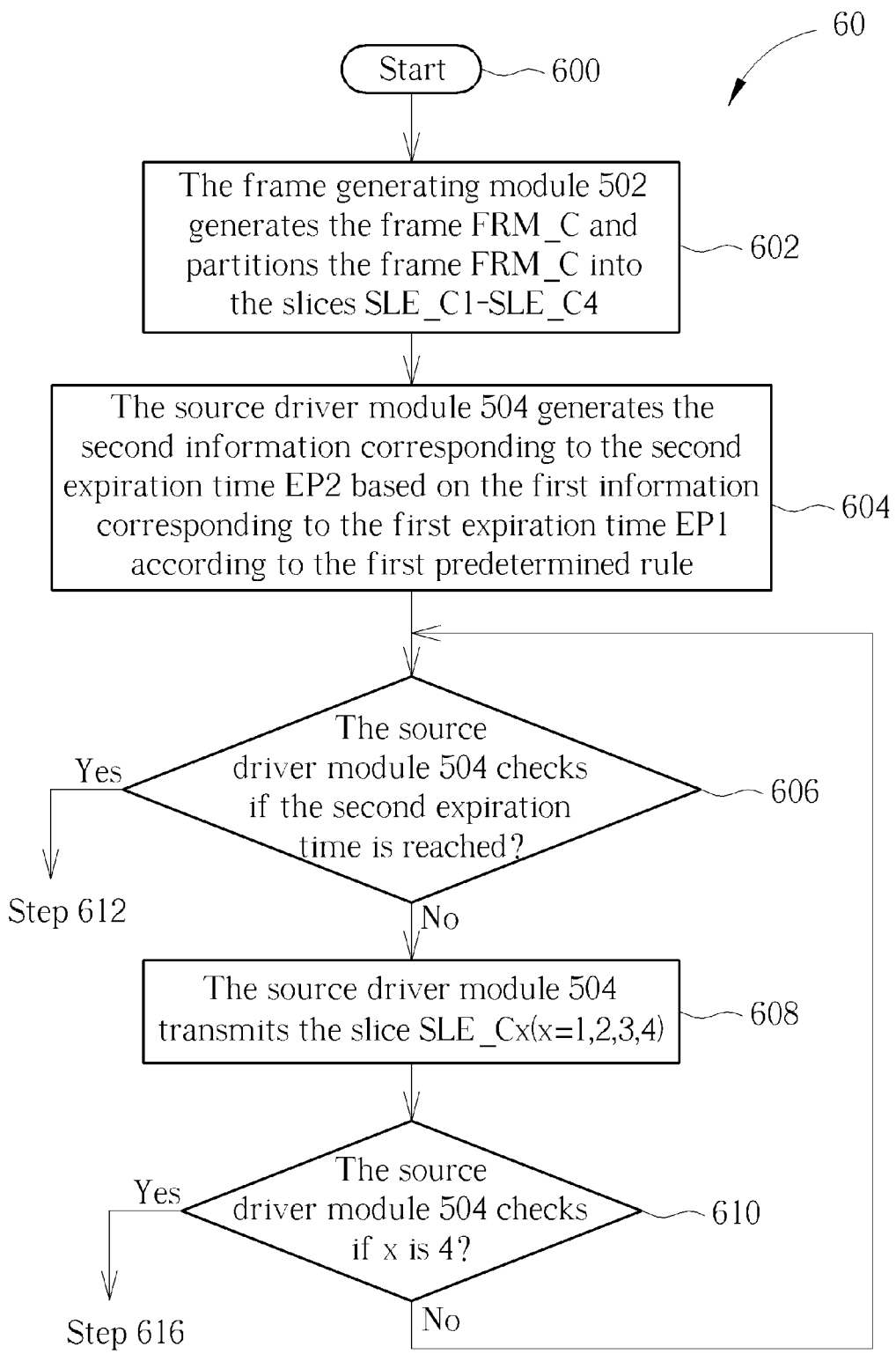
FIGS. 6A-6B are flowcharts of a process according to an example of the present invention.
Figure 6B:
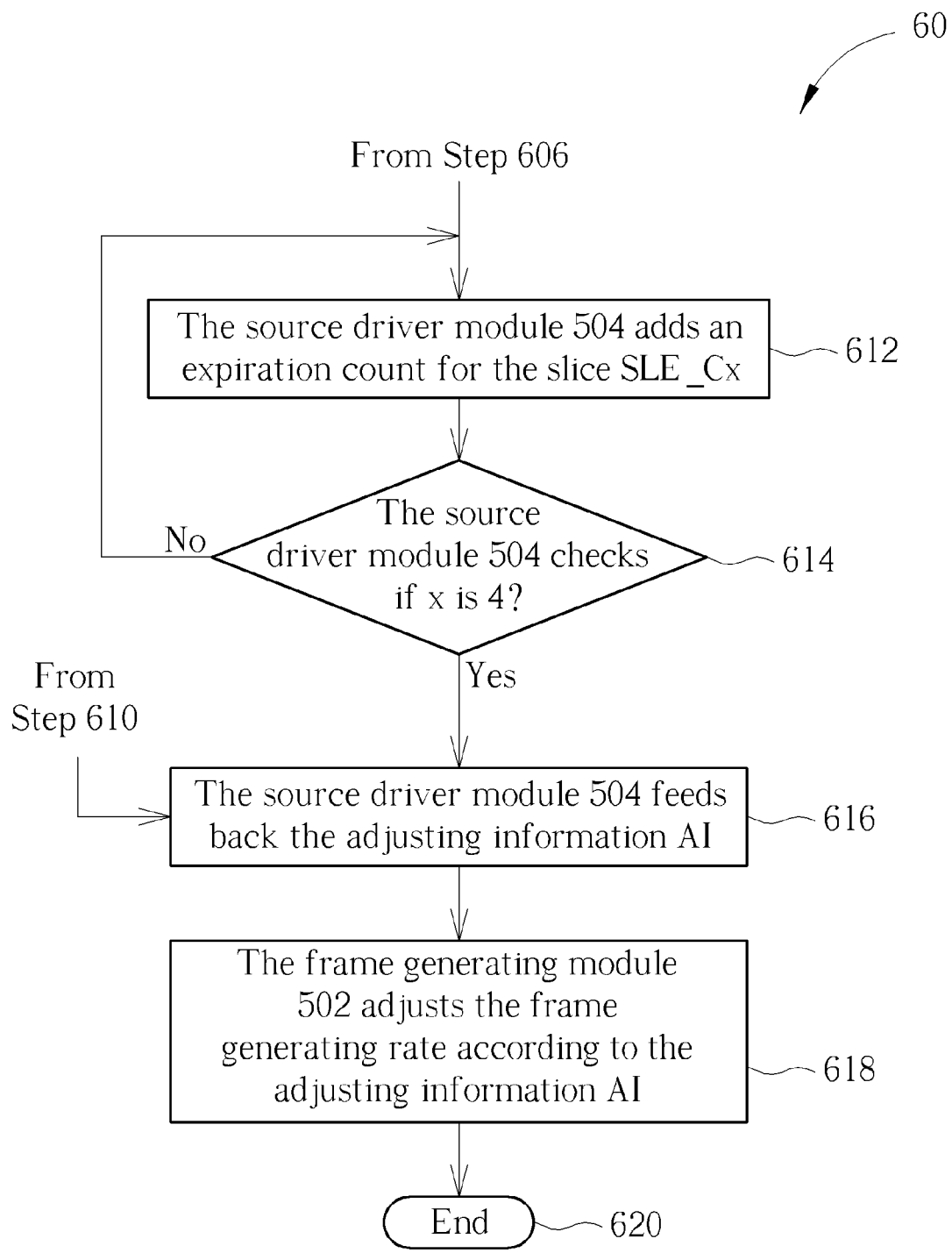

As can be seen, the transmitting operation of the source device 500 can be summarized to a process 60. Please refer to FIG. 6A and FIG. 6B, which are flowcharts of the process 60 according to an example of the present invention. The process 60 can includes the following steps:

Step 600: Start.

Step 602: The frame generating module 502 generates the frame FRM_C and partitions the frame FRM_C into the slices SLE_C1-SLE_C4;

Step 604: The source driver module 504 generates the second information corresponding to the second expiration time EP2 based on the first information corresponding to the first expiration time EP1 according to the first predetermined rule.

Step 606: The source driver module 504 checks if the second expiration time is reached? If yes, go to step 612; if not; go to step 608.

Step 608: The source driver module 504 transmits the slice SLE_Cx (x=1, 2, 3, 4).

Step 610: The source driver module 504 checks if x is 4? If yes, go to step 616; if not, add 1 to x and go back to step 606.

Step 612: The source driver module 504 adds an expiration count for the slice SLE_Cx.

Step 614: The source driver module 504 checks if x is 4? If yes, go to step 616; if not, add 1 to x and go back to step 612.

Step 616: The source driver module 504 feeds back the adjusting information AI.

Step 618: The frame generating module 502 adjusts the frame generating rate according to the adjusting information AI.

Step 620: End.

In brief, in the process 60, the source driver module 504 decides if transmitting the slice SLE_Cx according to the second information corresponding to the second expiration time EP2 and feeds back the adjusting information AI to the frame generating module 502 to adjust the frame generating rate. When the adjusting information AI shows that the situation of dropping and retrying is severe, the frame generating rate can be decreased, such that the extra latency due to the retransmission can be reduced.

In the present invention, the source driver module of the source device decides whether to transmit the slice according to the specific time and feeds back the adjusting information to the frame generating module of the source device. Therefore, the frame generating module of the source device can adjust the frame generating rate accordingly and reduce the extra latency.

To sum up, the present invention provides a method for adjusting frame generating rate, to reduce the latency, and further increase the quality of transmissions and displays.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for frame rate control in a transmitter of a wireless communications system, the method comprising:
   generating a frame and a first information corresponding to a first expiration time of the frame by a frame generating module, wherein the first information is a frame generating time;
   transmitting or dropping the frame according to the first expiration time by a driver module; and
   informing the frame generating module an adjusting information according to a first pre-determined rule by the driver module.

2. The method of claim 1, wherein the step of transmitting or dropping the frame comprises:
   transmitting the frame if the first expiration time is not reached and dropping the frame if the first expiration time is reached.

3. The method of claim 1, wherein the step of transmitting or dropping the frame comprises:
   generating a second expiration time according to the first information and a second predetermined rule.

4. The method of claim 3, wherein the second pre-determined rule is determined according to a frame type of the frame and a system delay.

5. The method of claim 3, wherein the step of transmitting or dropping the frame further comprises:
   transmitting the frame if the second expiration time is not reached and dropping the frame if the second expiration time is reached.

6. The method of claim 1, wherein the first pre-determined rule is determined according to a transmission count, an expiration count or a retry count.

7. The method of claim 6, further comprising:
updating the transmission count, the expiration count or the retry count depending on whether the frame is transmitted or dropped.

8. The method of claim 1, wherein the wireless communications system is implemented with Wi-Fi Display specification.

9. A communication apparatus for a wireless communications system, comprising:
a processor;
a storage unit; and
a program code, stored in the storage unit, wherein the program code instructs the processor to execute the following steps:
generating a frame and a first information corresponding to a first expiration time of the frame by a frame generating module, wherein the first information is a frame generating time;
transmitting or dropping the frame according to the first expiration time by a driver module; and
informing the frame generating module an adjusting information according to a first pre-determined rule by the frame generating module.

10. The communication apparatus of claim 9, wherein the step of transmitting or dropping the frame comprises:
transmitting the frame if the first expiration time is not reached and dropping the frame if the first expiration time is reached.

11. The communication apparatus of claim 9, wherein the step of transmitting or dropping the frame comprises:
generating a second expiration time according to the first information and a second predetermined rule.

12. The communication apparatus of claim 11, wherein the second predetermined rule is determined according to a frame type and a system delay.

13. The communication apparatus of claim 11, wherein the step of transmitting or dropping the frame further comprises:
transmitting the frame if the second expiration time is not reached and dropping the frame if the second expiration time is reached.

14. The communication apparatus of claim 9, wherein the first pre-determined rule is determined according to a transmission count, an expiration count or a retry count.

15. The communication apparatus of claim 12, wherein the steps further comprise:
updating the transmission count, the expiration count or the retry count depending on whether the frame is transmitted or dropped.

16. The communication apparatus of claim 9, wherein the wireless communications system is implemented with Wi-Fi Display specification.

* * * * *